United States Patent [19]

Sjogren

[11] Patent Number: 5,006,041
[45] Date of Patent: Apr. 9, 1991

[54] CONNECTION ASSEMBLY FOR TRANSMITTING THE LOAD OF AN INTERCEPT ARM DIRECTLY TO THE PITCH CENTERLINE OF THE DRIVE CHAIN

[75] Inventor: Christer A. Sjogren, Miami, Fla.

[73] Assignee: Quipp, Incorporated, Miami, Fla.

[21] Appl. No.: 397,584

[22] Filed: Aug. 23, 1989

[51] Int. Cl.⁵ .............................................. B65G 57/03
[52] U.S. Cl. .................................. 414/790.4; 198/712
[58] Field of Search .............. 414/790.4, 790.6, 790.7, 414/794.1, 794.2; 198/712, 802, 845

[56] References Cited

U.S. PATENT DOCUMENTS

| | | | |
|---|---|---|---|
| 998,495 | 4/1910 | Godit | 198/712 X |
| 2,022,300 | 11/1934 | Shaw | 198/172 X |
| 2,746,594 | 5/1956 | Engleson | 198/712 |
| 3,429,239 | 2/1969 | Murchison | 198/802 X |
| 3,526,170 | 9/1970 | Oderman | 414/790.4 |
| 3,568,815 | 3/1971 | Wiseman | 414/790.4 X |
| 3,770,107 | 11/1973 | Michelbach | 198/802 X |
| 4,398,455 | 8/1983 | Merwarth | 414/790.4 X |

Primary Examiner—David A. Bucci
Assistant Examiner—Craig Slavin
Attorney, Agent, or Firm—Louis Weinstein

[57] ABSTRACT

Intercept arms of a stacker are coupled to the drive chains by connecting links pivotally connected at one end directly to one of the drive chain links so that the pivot point of the connecting link is coincident with the pitch centerline of the drive chain resulting from the fact that the connecting link forms an integral part of the drive chain, directly replacing one of the drive chain rollers. The connecting link design provides a mechanical advantage of five to one and is pivotally mounted and angled so that the connecting link is free to pivot about the chain to avoid interference as the intercept arm moves about the sprocket, providing greater stability to the intercept arm while simultaneously increasing the mechanical advantage thereby significantly reducing power losses.

16 Claims, 5 Drawing Sheets

Fig. 5

CONNECTION ASSEMBLY FOR TRANSMITTING THE LOAD OF AN INTERCEPT ARM DIRECTLY TO THE PITCH CENTERLINE OF THE DRIVE CHAIN

FIELD OF THE INVENTION

The present invention relates to stackers and more particularly to a coupling assembly for coupling an intercept arm to a chain drive for improving the power transfer and reducing play therebetween.

BACKGROUND OF THE INVENTION

Stackers are typically employed for the purpose of stacking signatures delivered thereto in the form of a signature stream of signatures arranged in "shingle" or imbricated fashion. The stacker is provided with a plurality of buckets which are guided about a closed loop path, typically by means of cam follower rollers arranged on the buckets which rollingly engage a closed loop cam recess. The buckets are maintained at spaced intervals about the closed loop path by means of drive chains, each bucket being linked to the drive chains by coupling links having one end pivotally connected to the bucket assembly and the opposite end pivotally connected to a substantially T-shaped link forming an integral part of the drive chains. The drive chains are typically moved by suitable motor means to advance the buckets through each of the regions of the closed loop path which typically comprise: a home position at which a bucket is located above the signature stream preparatory to intercepting the signature stream; an intercept position to which the bucket in the home position is abruptly moved to intercept the signature stream and divert the flow of signatures from the downstream bucket to the bucket now in the intercept position; a stacking region through which the bucket is moved downstream relative to the intercept position as it collects signatures; a drop region through which the bucket moves as it leaves the stacking region wherein the bucket is rapidly accelerated to drop out from beneath the signature batch accumulated thereon to enable the signature batch to fall upon an outfeed surface; and a return region through which the bucket passes in moving from the drop region to the home position in readiness for intercepting the next bundle.

The aforementioned connecting links which couple each bucket to the drive chain are each provided to compensate for any differences in the pitch centerlines of the closed loop cam recess and the closed loop drive chain.

The bucket imparts a force upon the chain which is applied to the pivot point of the T-shaped link forming part of the drive chain. Since this pivot point is offset from the pitch centerline, when a load is applied, a turning moment is created resulting in excessive play and less efficient power transmission.

BRIEF DESCRIPTION OF THE INVENTION

The present invention is characterized by comprising a coupling assembly design which provides increased efficiency and greatly reduces play by transmitting the load directly to the pitch centerline of the chain. This is achieved by means of a connecting link which is an integral part of the chain and which has one end thereof replacing one of the rollers in the chain.

The power is thus coupled directly to the pitch centerline of the chain resulting in a mechanical advantage of five to one, which corresponds to a vector angle of 11.3 degrees. The link is angled and is free to pivot about the centerline to avoid interference as it moves around the chain drive sprockets, thereby yielding more efficient power transmission and significantly reducing play.

OBJECTS OF THE INVENTION

It is, therefore, one object of the present invention to provide a novel connecting link for use in stackers and the like for coupling a stacker bucket to the chain drive so as to transmit a load applied to a chain directly to the pitch centerline of the chain.

Another object of the present invention is to provide a novel assembly for connecting stacker buckets to a drive chain and including an angled coupling link which couples the load imposed upon the chain by the bucket to a coupling point coincident with the pitch centerline of the drive chain.

Still another object of the present invention is to provide a novel assembly for coupling a bucket to a drive chain and including an angled coupling link for providing a mechanical advantage in the pulling direction.

Still another object of the present invention is to provide a novel coupler for coupling a stacker bucket to a drive chain and including an angled coupling link which prevents any interference with the drive chain as it moves about the drive or driven sprockets.

BRIEF DESCRIPTION OF THE FIGURES

The above objects of the present invention will become apparent when reading the accompanying description and drawing, in which:

FIG. 6b shows a top plan view of the clamp of FIG. 6a and looking in the direction of arrows B—B of FIG. 6a;

FIG. 6c shows a, bottom plan view of the clamp looking in the direction of arrows C—C of FIG. 6a;

DETAILED DESCRIPTION OF THE INVENTION

Figure 1:
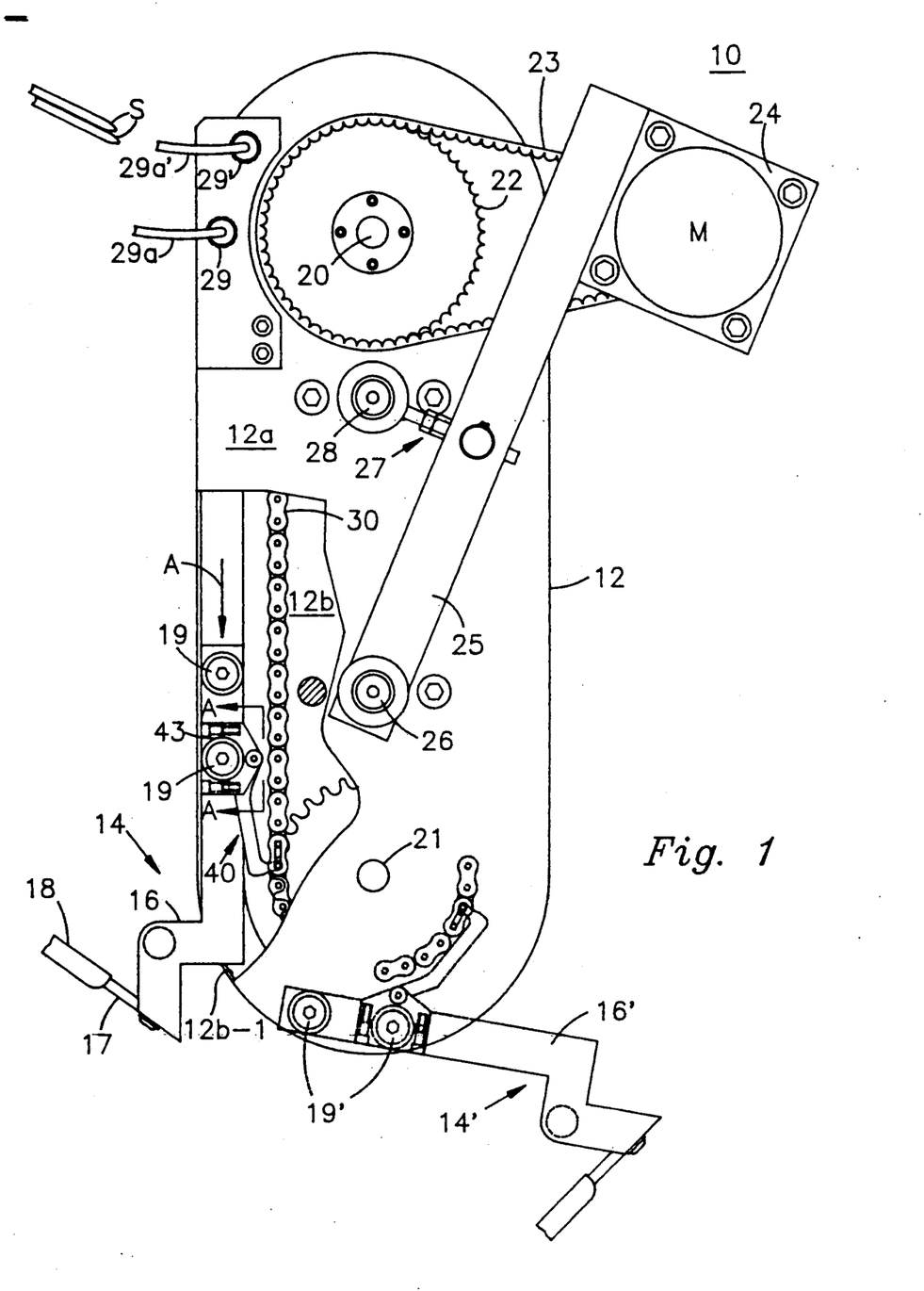
FIG. 1 shows an end elevational view of the stacking section of a stacker incorporating the present invention.

FIG. 1 shows a stacking section 10 which may use the present invention to great advantage. A Sept. 19, 1989 detailed description of the stacking section, as well as other associated components of the stacker assembly have been omitted for purposes of simplicity. It should be understood that the present invention may be utilized with equal success in stackers of either the single or dual drive type, the only requirement being that the stacker be comprised of guided buckets respectively coupled to a drive chain.

The stacking section 10 receives signatures S from an infeed section, omitted from the present application for purpose of simplicity. The signatures are arranged in overlapping "shingle" or imbricated fashion and are delivered to the stacking section in this manner and folded edge forward for forming batches of a predetermined number of bundles.

Stacking section 10 is comprised of a mounting or support assembly 12 typically comprised of a pair of frames 12a, 12b, each frame being provided along its interior surface with a closed loop recess such as, for example, the closed loop recess 12b-1 provided in side plate 12b. These two recesses form closed loop cams which guide the buckets about the closed loop path. Two typical buckets 14 and 14' are shown in FIG. 1. Each bucket is comprised of a mounting bracket 16, 16' having intercept blades 18, 18' secured thereto by blade mounting arms 17, 17'. The bucket assemblies 14, 14' are each provided with mounting rods having cam follower rollers arranged at opposing ends thereof, such as, for example, the cam follower rollers 19, 19 which rollingly engage the closed loop cam recess provided inside plate 12a, similar cam follower rollers being provided at the opposite ends of the bucket mounting rods for rollingly engaging the cam recess 12b-1. As can be seen, the cam follower rollers 19, 19' cooperate with the cam recess to guide and orient the bucket assemblies 14, 14' about the closed loop path. For example, bucket 14 can be seen to be aligned in a vertical direction as its cam follower rollers move through the straight line portion of the cam recess 12b-1 while bucket 14' is aligned close to horizontal as its cam follower rollers 19, 19' follow the lower curved portion of the cam recesses. Sensors 29, 29' sense the presence of the cam rollers 19, 19', respectively to detect the arrival of a bucket assembly at the "home" position in readiness for an intercept operation. The sensors 29, 29' are coupled to the system controller (not shown) by conductors 29a, 29a'.

The stacking section 12 is further comprised of a pair of upper and lower shafts 20, 21 each having provided thereon a pair of sprockets for guiding a closed loop drive chain such as, for example, the drive chain 30. Upper shaft 20 is preferably mounted between a pair of bearings to permit freewheeling rotation of the shaft. The upper pair of sprockets are fixedly secured to the upper shaft 20 which is driven by a drive motor M having a drive pulley coupled to its output shaft (not shown for purposes of simplicity) for driving driven pulley 22 by means of a timing belt 23 entrained about the two aforementioned pulleys.

Motor M is mounted upon a support plate 24 secured to one end of swingable arm 25 mounted to swing about a shaft 26. A tension adjusting assembly 27 is coupled between a shaft 28 and a tapped member (not shown) arranged intermediate the ends of swingable arm 25 for adjusting the timing belt 23 to the proper tension.

As was mentioned hereinabove, the buckets are arranged at spaced intervals and are driven about the closed loop path defined by the cam recesses, such as cam recess 12b-1, by means of the pair of drive chains, only one of which, namely drive chain 30, is shown in FIG. 1.

Each bucket is connected to the drive chain by means of a coupling assembly (to be more fully described). The direction of travel of the buckets is shown by arrow A in FIG. 1.

Figure 2:
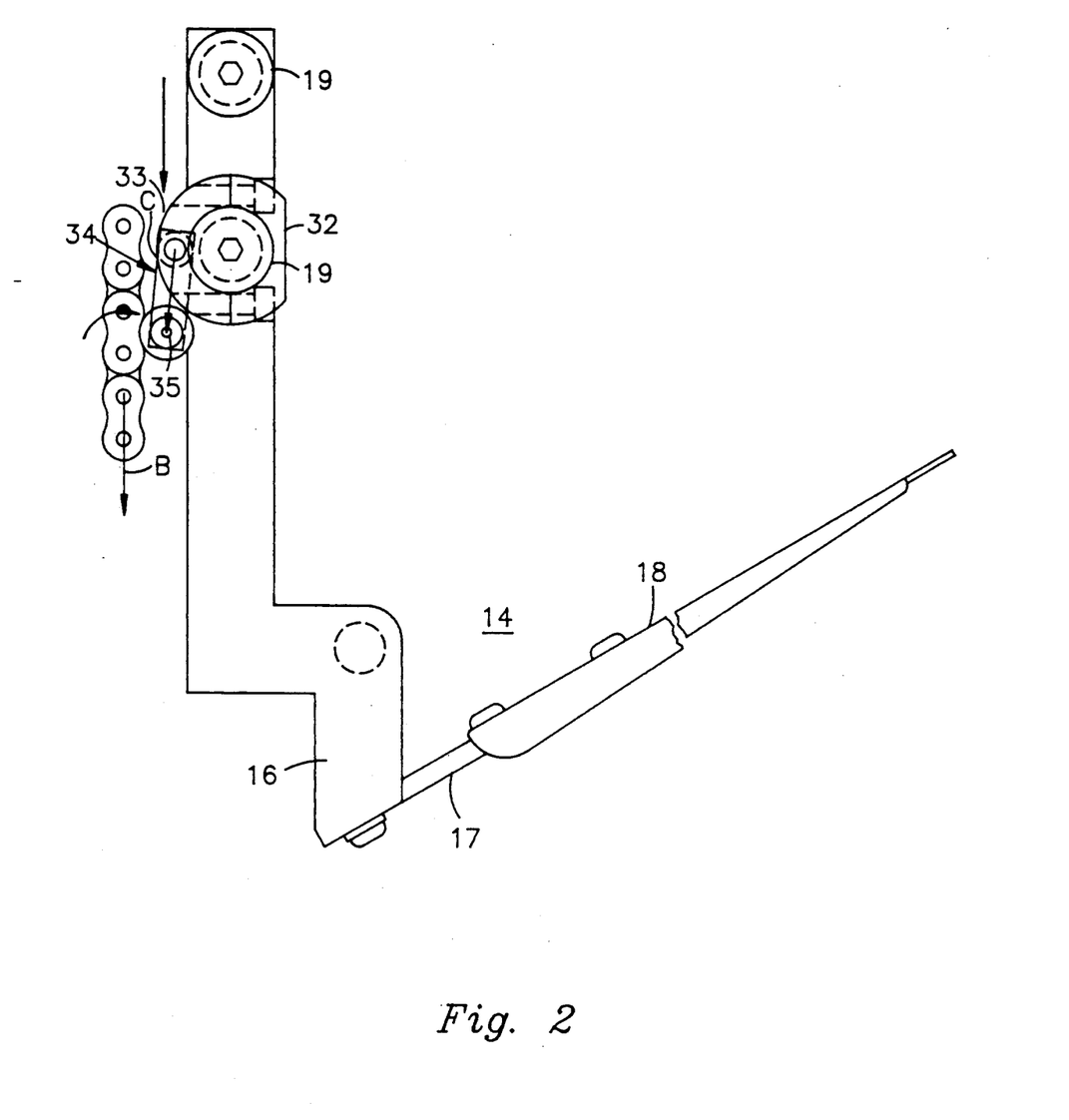
FIG. 2 shows a side view of a bucket assembly and a portion of a drive chain and incorporating a conventional coupling assembly.
Figures 3A, 3B:
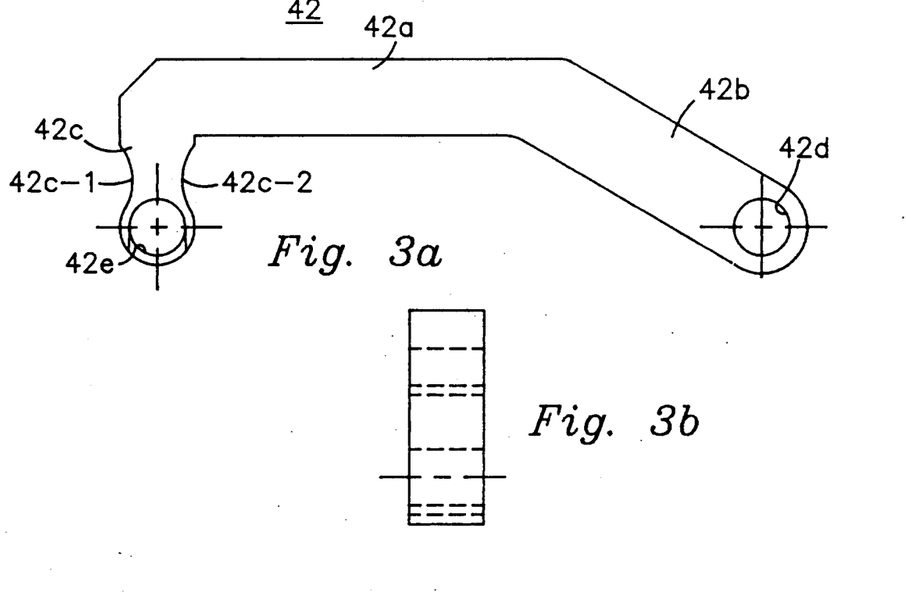
FIGS. 3a and 3b show side and end views respectively of the connecting link of FIG. 1.

FIG. 2 shows a bucket assembly 14 substantially the same as the bucket assembly 14 of FIG. 1 and further showing the manner in which the bucket assembly 14 is coupled to the drive chain. More specifically, a clamping member 32 is mounted upon the rod supporting lower cam follower roller 19 and is provided with a pin 33 for pivotally coupling a connecting link 34 to a substantially T-shaped chain attachment 31, the connecting link 34 being coupled to the T-shaped chain attachment 31 by means of a pin 35.

The arrow B represents the direction of travel of chain 30, as well as the pitch centerline of the chain. It can be seen that the pivot point of pin 35 is displaced from the pitch centerline of chain 30 and, when a load is applied, as represented by arrow C, an overturning (i.e. twisting) moment is created resulting in excessive play and less efficient power transmission.

The design of the present invention overcomes these disadvantages through the employment of the coupling assembly 40 shown in FIG. 1 and shown in greater detail in FIGS. 3a-7. Coupling assembly 40 is comprised of a link 42 having an intermediate portion 42a, an integral portion 42b extending at a predetermined angle from intermediate portion 42a and a right-angle portion 42c integral with intermediate portion 42a. The free end of link portion 42b is rounded and is provided with a circular opening 42d. Right-angle portion 42c is rounded in the manner shown at its free end and is provided with a circular-shaped opening 42e.

Figure 4A:
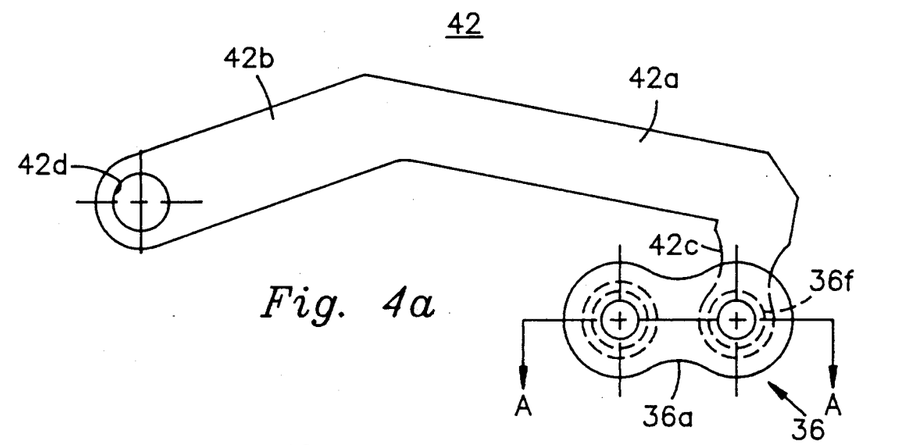
FIG. 4a shows an assembly view of the connecting link and one cooperating roller link of the drive chain.
Figure 4B:
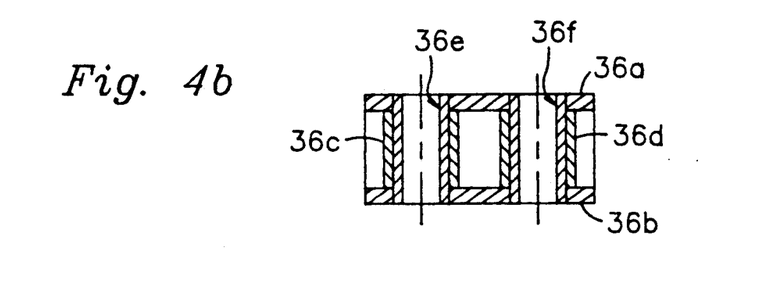
FIG. 4b shows a sectional view of the connecting link and chain link of FIG. 4a looking in the direction of arrows A—A.

The connecting link 42 is coupled to a chain roller link assembly 36 comprised of upper and lower link plates 36a, 36b and rollers 36c, 36d respectively arranged on bushings 36e, 36f. Roller 36d of the conventional assembly shown best in FIG. 4b is removed and replaced by the connecting link 42 in the manner shown best in FIG. 4a. It should be noted that the connecting link rounded portion is provided with the same outside diameter as the removed roller 36d, as well as being the same outside diameter as the remaining rollers such as, for example, roller 36c. As will be noted from a consideration of FIGS. 1 and 4a, connecting link 42 is free to pivot about bushing 36f through a substantially large angle due to the round shape of the end and the concave portions 42c-1 and 42c-2.

The opposite end of connecting link 42 is coupled to the shaft supporting the lower cam follower roller 19 as shown in FIG. 1 by means of a clamp assembly 43 comprised of a pair of clamping members 43a and 43b, each having a substantially semi-circular shaped surface portion which cooperatively defines an opening 01 for receiving the rod 19a upon which lower cam roller 19 is mounted. Clamp halves 43a and 43b are secured to one another by suitable threaded fasteners F1, F1, F1 which extend through openings 43b-1, 43b-2 and 43b-3 provided in clamp member 43b. The threaded portions of fasteners F1, F1, F1 engage tapped apertures 43a-1, 43a-2 and 43a-3 provided in clamp member 43a to secure clamp members 43a and 43b to one another and to further secure the clamp 43 to rod 19a.

Free end 42b is arranged within a slot 43a-4 provided in clamp member 43a. A fastener F2 extends through a larger diameter opening 43a-5 and a tapped opening 43a-6, the fastener extending across slot 43a-4 and through opening 42d in connecting link 42 to swingably mount the connecting link to the rod 19a. It should be understood that a pair of coupling assemblies each comprised of the connecting link and clamp are arranged at opposite ends of each bucket assembly for coupling to an associated one of the drive chains.

Figure 5:
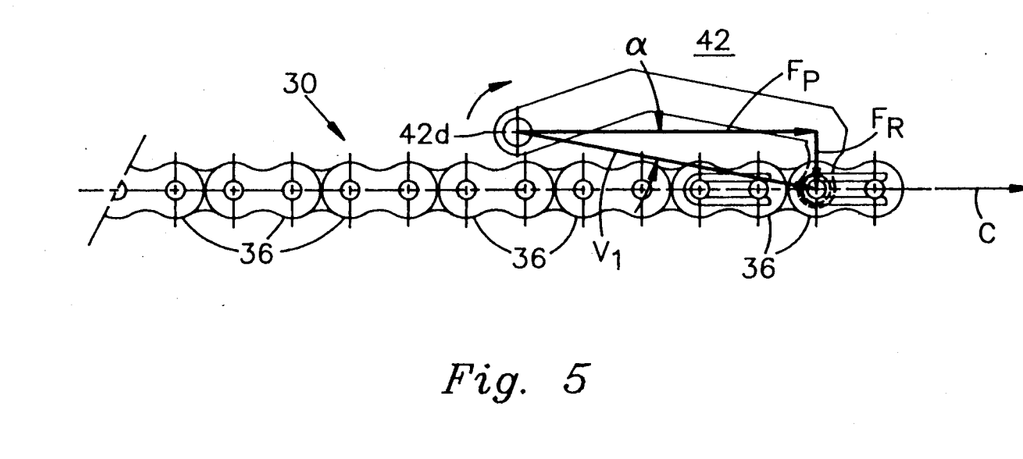
FIG. 5 shows the connecting link coupled to the drive chain further showing the load distribution and the forces exerted upon the drive chain and is useful in explaining the advantageous features of the present invention.
Figure 6A:
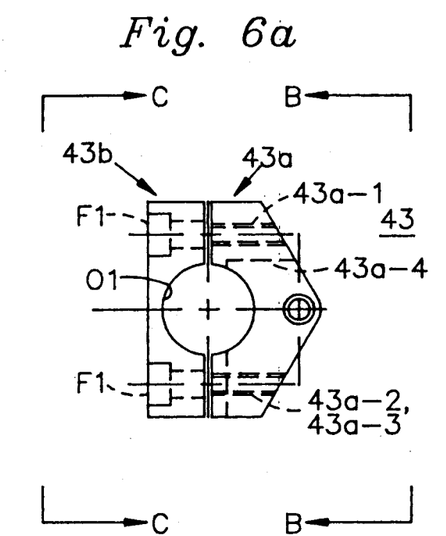
FIG. 6a shows a side elevational view of the clamp employed in FIG. 1 for coupling the connecting link to the bucket.
Figure 6B:
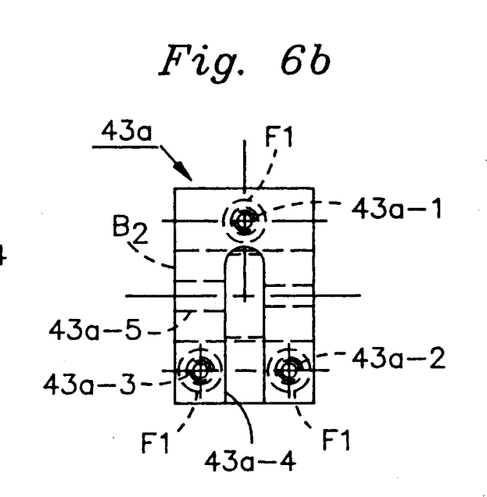
Figure 6C:
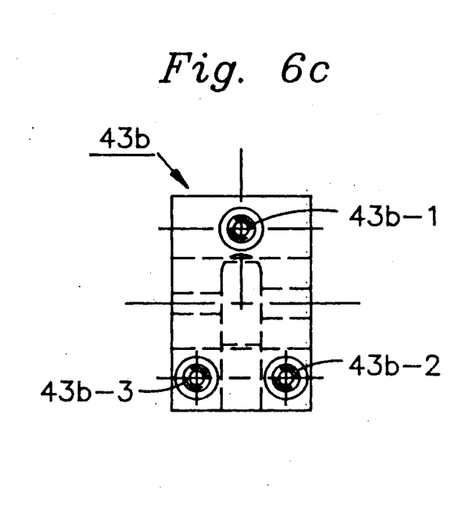
Figure 6D:
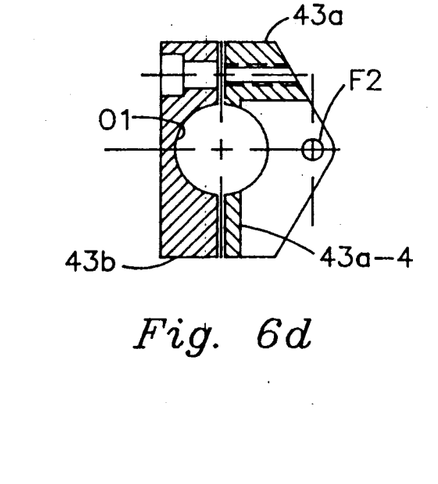
FIG. 6d shows a sectional view of the clamp looking in the direction of arrows A—A of FIG. 6b.
Figure 7:
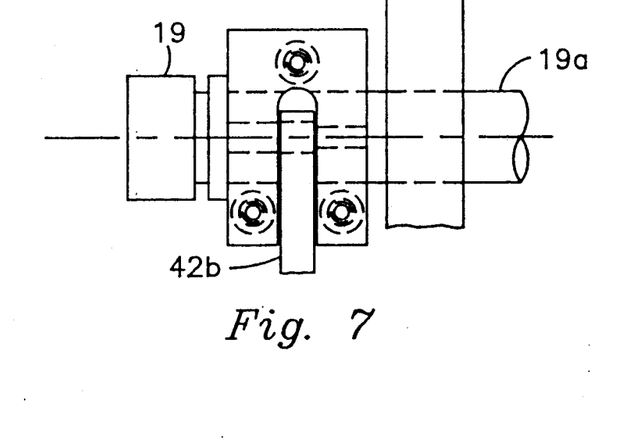
FIG. 7 shows an assembly view of the clamp and connecting link looking in the direction of arrows A—A of FIG. 1.

FIG. 5 shows a portion of one of the drive chains 30 and the connecting link 42 as well as showing the force vectors to facilitate an understanding of the advantageous features, including the mechanical advantage, derived from the present invention.

Arrow C represents the direction of movement of the drive chain 30 as well as the pitch centerline of the drive chain 30. Connecting link 42, which is free to pivot about both of its ends by virtue of the pins extending through opening 42d and the bushing 36f extending through opening 42e, applies a force to chain 30 represented by vector V1. The design of link 42 is such that the vector component $F_P$, namely the force component in the pulling direction, as opposed to the vector component $F_R$, namely the force component in the radial direction is 5:1 which corresponds to an angle $\alpha$ of 11.3 degrees. The shape of the connecting link 42 is designed to provide the desired amount of pivotal movement about each pivot pin without interfering with the normal movement of the bucket assembly. For example, connecting link 42 is provided with a right angle portion 42c which is further rounded in the manner shown best in FIGS. 3a, 4a and 5 to permit the connecting link 42 to pivot about the centerline of bushing 36f upon which the connecting link is mounted. In addition thereto, the connecting link is angled to avoid any interference with the drive chain as it passes about either the lower or upper sprocket as shown, for example, by the bucket 14' in FIG. 1. Thus, the design of the present invention provides greater stability to the intercept arm of the bucket while simultaneously increasing the mechanical advantage, thus significantly reducing power loss.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

What is claimed is:

1. A coupling assembly for coupling a stacker bucket for stacking signatures to a drive chain comprising:
    said drive chain including a plurality of pairs of link plates, said pairs being pivotally connected to one another in end-to-end fashion to form a closed loop;
    a connecting link having first and second ends;
    first means for pivotally coupling said first end to said drive chain, said first end being arranged between and pivotally coupled to one of said pairs of link plates so that said drive chain and the connecting link lie in a common plane, the link plates being substantially parallel to the connecting link first end;
    second means for pivotally coupling said second end to said bucket;
    the pivot axis of said first means being coincident with the pitch centerline of said drive chain; and
    said connecting link first and second ends being respectively rotatable relative to the drive chain and the bucket.

2. The coupling assembly of claim 1 wherein said coupling link comprises and intermediate portion, said first end of said connecting link comprising an integral arm portion arranged at right angles to said intermediate portion.

3. The coupling assembly of claim 2 wherein said second end of said connecting link comprises an arm portion integral with said intermediate arm portion and forming a predetermined angle so that the second arm portion is diagonally aligned relative to said intermediate arm portion.

4. The coupling assembly of claim 3 wherein said angle is greater than 90 degrees.

5. The coupling assembly of claim 2 wherein the right-angle portion of said connecting link has a rounded free end.

6. The coupling assembly of claim 1 wherein the portion of said connecting link coupled to said drive chain has a rounded free end to facilitate rotatable movement about its pivot axis which is coincident with the pitch centerline of the chain.

7. A coupling assembly for coupling a stacker bucket to a drive chain comprising:
    a connecting link having first and second ends;
    first means for pivotally coupling said first end to said drive chain;
    second means for pivotally coupling said second end to said bucket;
    the pivot axis of said first means being coincident with the pitch centerline of said drive chain;
    the portion of said connecting link coupled to said drive chain having a rounded free end to facilitate pivotal movement about its pivot axis which is coincident with the pitch centerline of the chain;
    said drive chain comprising a plurality of interconnected links, each link having at least one roller;
    one of said links having its roller replaced by the rounded free end of said connecting link.

8. The coupling assembly of claim 1 wherein said drive chain is comprised of a plurality of interconnected links, each of said links comprising:
    a pair of said link plates maintained in spaced parallel fashion by bushing means;
    roller means arranged between said link plates, each bushing means extending through one of said roller means;
    said rounded portion of said connecting link having a central opening for receiving one of said bushings, said connecting link being adapted to pivot about said bushing.

9. The coupling assembly of claim 1 wherein said second means further comprises:
    clamp means positioned along one side of said bucket for pivotally clamping said connecting link to said bucket.

10. The coupling assembly of claim 9 wherein said bucket has a cam follower roller, said clamp means being coupled to said bucket adjacent said cam follower roller, the center of said clamp means being coincident with the center of said cam follower roller.

11. A coupling assembly for coupling a stacker bucket to a drive chain comprising:
a connecting link having first and second ends;
first means for pivotally coupling said first end to said drive chain;
second means for pivotally coupling said second end to said bucket;
the pivot axis of said first means being coincident with the pitch centerline of said drive chain;
said second coupling means comprising:
a clamp assembly having first and second clamp halves;
said clamp halves each having a semi-circular shaped groove, said semi-circular shaped grooves cooperating to form a circular-shaped opening when said clamp halves are secured to one another;
one of said clamp halves having a slot for receiving the second end of said connecting link;
said slot being defined by a pair of spaced sidewalls each having an opening;
said openings being coaxially aligned;
pin means extending through said openings and an opening provided in the second end of said connecting link for pivotally coupling said connecting link to said bucket.

12. In a stacker comprised of at least one closed loop drive chain entrained about a drive and a driven sprocket;
stacking bucket means;
said drive chain including a plurality of pairs of link plates said pairs being pivotally connected to one another in end-to-end fashion to form a closed loop;
recess means for defining a closed loop path congruent to the closed loop path defined by the drive chain entrained about said sprockets;
said bucket means having cam follower means rollingly engaging said recess means and cooperating with said recess to define the closed loop path along which said bucket means is moved;
coupling means for coupling said bucket means to said drive chain;
said coupling means having a first end pivotally coupled to said drive chain and swingable thereabout such that the pivot means is coincident with the pitch centerline of said drive chain, said first end being arranged between and pivotally coupled to one of said pairs of link plates so that said drive chain and the coupling link lie in a common plane, the link plates being substantially parallel to the connecting link first end; and
second means for pivotally connecting the opposite end of said coupling means to said bucket means.

13. The stacker of claim 12 wherein said bucket means has a cam follower roller, said second means being coupled to said bucket means adjacent said cam follower roller, the center of said cam follower roller being coincident with the center of said second means.

14. In a stacker comprised of at least one closed loop drive chain entrained about a drive and a driven sprocket;
stacking bucket means;
recess means for defining a closed loop path congruent to the closed loop path defined by the drive chain entrained about said sprockets;
said bucket means having cam follower means rollingly engaging said recess means and cooperating with said recess means to define the closed loop path along which aid bucket means is moved;
coupling means for coupling said bucket means to said drive chain;
said coupling means having a first end pivotally coupled to said drive chain and swingable thereabout such that the pivot means is coincident with the pitch centerline of said drive chain;
second means for pivotally connecting the opposite end of said coupling means to said bucket means;
said second means comprising:
a clamp assembly having first and second clamp halves;
said clamp halves each having a semi-circular shaped groove, said semi-circular shaped grooves cooperating to form a circular-shaped opening when said clamp halves are secured to one another;
one of said clamp halves having a slot for receiving the second end of said connecting link;
said slot being defined by a pair of spaced sidewalls each having an opening;
said openings being coaxially aligned;
pin means extending through said openings and an opening provided in the second end of said connecting link for pivotally coupling said connecting link to said bucket.

15. The coupling assembly of claim 2 wherein the first and second ends of said connecting links each have an opening for respectively receiving said first and second means;
the centers of said openings lying on an imaginary straight line which is parallel to said intermediate portion.

16. The coupling assembly of claim 3 wherein the configuration of the connecting link provides a mechanical advantage of 5:1 such that a component of the force applied to the chain by the coupling link which is aligned with the chain pitch line is five times greater than a component of the force applied to the chain by the coupling link and extending at a right angle to the chain pitch line.

* * * * *

UNITED STATES PATENT AND TRADEMARK OFFICE
CERTIFICATE OF CORRECTION

PATENT NO. : 5,006,041
DATED : April 9, 1991
INVENTOR(S) : Christer A. Sjogren It is certified that error appears in the above-identified patent and that said Letters Patent is hereby corrected as shown below:

Column 3, line 5, delete "Sept. 19, 1989".

Column 6, Claim 2, line 9, change "and" to --an--.

Signed and Sealed this

Twenty-third Day of March, 1993

Attest:

STEPHEN G. KUNIN

*Attesting Officer*    *Acting Commissioner of Patents and Trademarks*